3,166,199
ATTACHMENT FOR TRACTORS
Alta F. Hawkins and Robert T. Hawkins, both of R.R. 1, Whitestown, Ind.
Filed Feb. 18, 1963, Ser. No. 259,066
5 Claims. (Cl. 211—182)

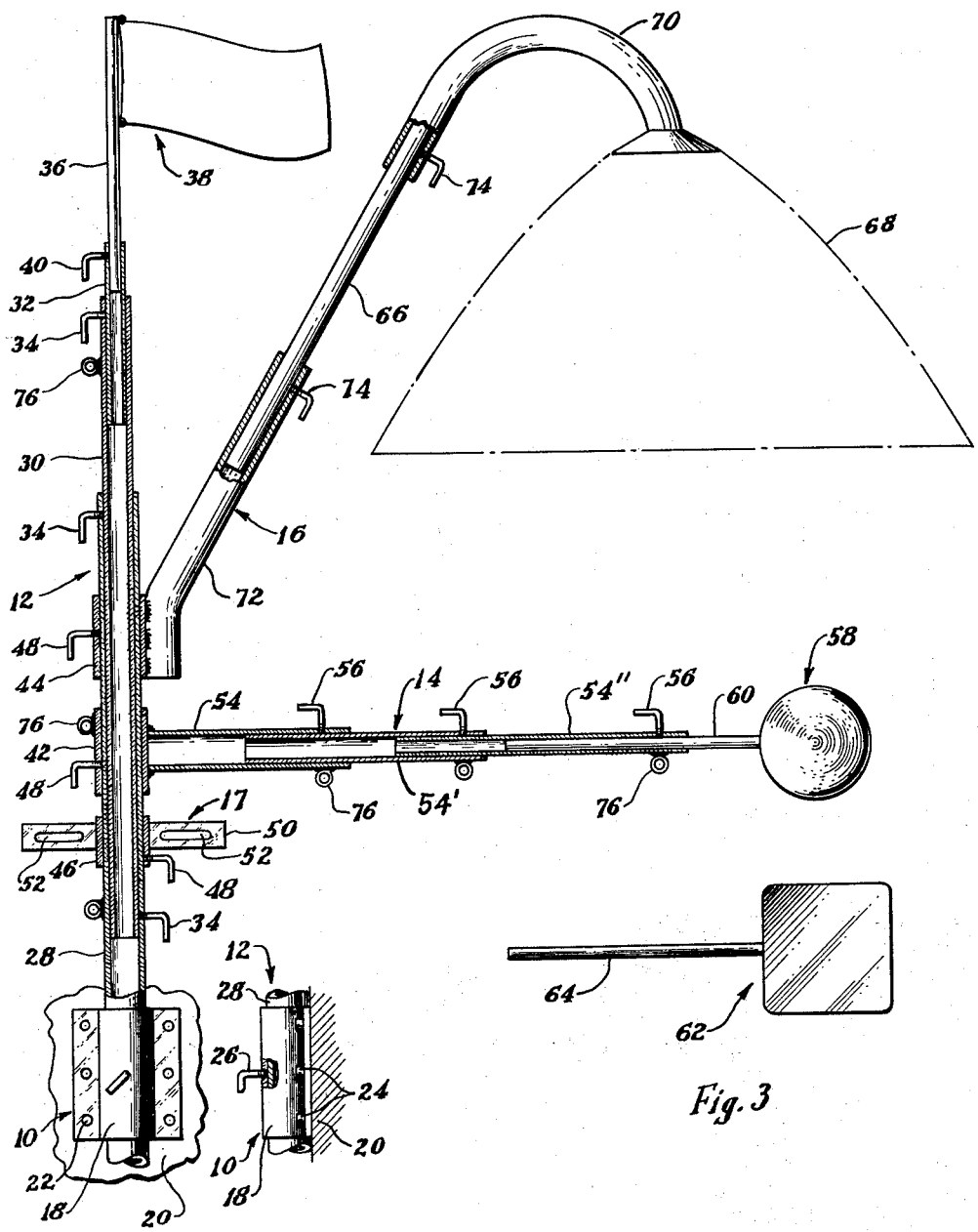

This invention relates to an attachment for vehicles, such as tractors, and has for its general object the provision of a multi-purpose supporting-attachment by which various auxiliary devices may be carried by the vehicle, as may be desired.

In carrying out our invention in an illustrative embodiment, we provide a bracket adapted to be mounted to the vehicle, and a primary column adapted to be carried by the bracket. One or more secondary supporting members are adapted to be carried by the primary supporting member; and secondary supporting members as well as the primary supporting member are adapted to carry auxiliary devices such as a flag, umbrella, light, and mirror. The supporting members are formed with telescoping components, and the components as well as the supporting members themselves are adapted for rotation about themselves and with respect to the vehicle, all providing great flexibility of adjustment and positioning of the auxiliary devices with respect to the vehicle; and at least one of the secondary supporting members is provided with an end-member which is similar to the end-member of the primary supporting member, further adding to the flexibility of carry by permitting the auxiliary devices to be carried on either the primary or the secondary supporting member.

The description of our invention so far given is introductory and rather general; and the foregoing and further and more particular objects, features, advantages, details, and concepts of the present invention will further appear in the following, more detailed description, reference being had to the accompanying somewhat diagrammatic drawings of illustrative embodiments, in which drawings:

FIG. 1 is an elevational view, partly in cross-section, illustrating an embodiment of our device mounted on an associated vehicle, and shown as supporting a flag and a signal as auxiliary devices carried thereby;

FIG. 2 is a side elevational view of the base-portion thereof; and

FIG. 3 is a view of another auxiliary device which may be carried by the attachment provided by our invention.

As shown in the drawings, our invention provides an attachment means for vehicles, whereby various types of auxiliary devices may be conveniently carried by the vehicle, and the invention provides great flexibility to permit the carry of such devices at various locations and positions of orientation with respect to the vehicle.

FIG. 1, which illustrates the main features of our invention, shows the general components to include a bracket 10, a primary supporting column such as member 12, a secondary supporting member such as the arm member 14, another secondary supporting member such as the member 16, and auxiliary bracket 17.

Bracket 10 is of a general U-shape; the bight 18 extending vertically when the bracket 10 is mounted on an associated vehicle 20. For such mounting, the bracket 10 is provided with a series of holes 22 through which extend mounting screws 24. A set screw 26, desirably of a general L-shape, is threadedly inserted into the bight 18 of bracket 10, for fixing the position of the primary supporting member 12 in the bight 18.

The primary supporting member 12 is shown as comprising a series of telescoping tubular members 28, 30, and 32; and L-shaped set screws 34 are shown as provided in the members 28, 30 and 32 for fixing the adjustment of the member telescoped therein. The telescoping member 32, which is the member remote from the bracket 10, is shown as hollow, and is adapted to receive a supporting rod or member 36 of a desired auxiliary device to be carried. Such a device, in FIG. 1, is shown as a flag 38; and the supporting-rod 36 thereof is fixed in its position in support-component 32 by a set screw 40 which is provided in support-component 32 to engage rod 36.

The primary support member 12 also carries the secondary support members 14 and 16, and bracket 17, for carrying other auxiliary devices as may be desired. Each of the members 14, 16, and 17 is shown as provided with a sleeve 42, 44, and 46, respectively, adapted to be received over the support-component 28 of support-member 12, and the position of such sleeves is shown as being fixable at desired positions of adjustment with respect to component 28 by set screws 48 provided in each such sleeve.

Now, observing the secondary members 14, 16, and 17 in the order they are observed in FIG. 1, beginning above the bracket 10, the first such member observed is the auxiliary bracket 17. It is shown as comprising a horizontal strip 50 provided with elongated slots 52 to accommodate the mounting of auxiliary devices having various bolt spacings. As one example, the bracket 17 may be used to support a vehicle license plate.

Now, observing secondary support member 14, it will be noted that it comprises a series of telescoping tubes 54, 54' and 54", the general construction of which is shown as identical to the construction of the telescoping tubes of primary support member 12, with L-shaped set screws 56 for fixing any desired adjusted position of the components 54', 54", and 60. The outer component 54" possesses the same receiving nature as the outer component 32 of support column 12, and thus auxiliary devices such as the flag 38 could be carried either by primary support column 12 or secondary support member 14. This similarity of receiving nature is shown by the outer component 54" of member 14 and the outer component 32 of column 12 both being of tubular stock having the same inside diameter. The auxiliary device shown carried by member 14 is a light 58, which may be of flasher-type, whose support rod 60 is shown received in the outer component 54" of member 14.

FIG. 3 illustrates a mirror 62 having a support rod 64 of the same diameter as the support rods 60 and 36 of light 58 and flag 38, respectively; and the mirror 62 may thus be carried by either of the primary or secondary columns or members 12 or 14.

The auxiliary support member 16, shown as supported on support column 12 by sleeve 44, is shown as extending upwardly and outwardly, and as formed with a telescoping intermediate member 66, and carrying another desired auxiliary device such as an umbrella 68. The position of the umbrella 68 may be set by appropriate adjustment of the intermediate member 66 with respect to the umbrella-supporting tube 70 and the base-tube 72 of support column 16, and that adjustment may be held by the L-shaped set screws 74 provided in members 70 and 72.

A series of cord-receiving fixtures such as loops 76 are shown along each of the columns or members 12 and 14 to carry an associated electric cord (not shown) for energizing auxiliary devices carried by those columns or members, as may be required by the nature of the particular auxiliary device. It will be understood that the devices could be battery-powered, or energized via the said cord from the vehicle battery.

Great flexibility of positioning and orientation of the carried auxiliary devices is achieved by several means: the supports 12, 14, and 16 all possess telescoping components, thus permitting length adjustment; the components of the members 12, 14, and 16 are rotatable with respect to the other components of the same member or column, thus permitting rotational adjustment of the carried auxiliary devices with respect to the axis of the respective columns or members 12, 14, and 16; the sleeves 42, 44, and 46 all may be swiveled about the axis of support column 12, permitting rotational adjustment, respectively, of support member 14, support member 16, and bracket 17 about the axis of primary support column 12; the primary support column 12 may itself adjust to a desired vertical position by the adjustment of its lower component 28 in the base-bracket 10; and the auxiliary devices, such as the flag 38, light 58, and the mirror 62 may be interchangeably carried on either member 12 or column 14.

Thus it is seen that the various concepts, relationships, and components, of the invention co-operate to provide an advantageous attachment for vehicles, having desirable characteristics of convenience, utility, and a wide range of adjustments in many respects with regard to the positioning and orientation of auxiliary devices supported thereby.

Accordingly, from the foregoing description of the invention according to the illustrated embodiments, considered with the accompanying drawings, it is seen that our invention provides a novel and useful device having desirable advantages and characteristics, and accomplishing its intended objects, including those hereinbefore pointed out and others which are inherent in the invention.

It will be understood that modifications and variations may be effected without departing from the scope of the novel concepts of the invention; accordingly we wish it to be understood that our invention is not limited to the embodiments thereof illustrated and described, or to the specific form or arrangement herein described and shown.

We claim as our invention:

1. An attachment for vehicles, comprising:
A bracket for mounting on a vehicle;
A primary series of telescoping members co-operating to provide a primary support column supported by said bracket;
A secondary series of telescoping members co-operating to provide a secondary support arm;
Means supporting said secondary support arm on said primary support column;
The end-portions of said primary and secondary support column and arm being provided with similar means for supporting an auxiliary device to permit said auxiliary device to be supported interchangeably by the column or arm at the choice of the user; and
Another support member supported by said primary support column for supporting an umbrella.

2. An attachment for vehicles, comprising:
A primary support column adapted to be mounted on an associated vehicle;
A secondary support arm adapted to be carried by said primary support column; and
The end-portions of said primary and secondary support column and arm being provided with similar means for supporting an auxiliary device to permit said auxiliary device to be supported interchangeably by the column or arm at the choice of the user.

3. An attachment for vehicles, comprising:
A pair of support members, a first one of which is a column member adapted to be mounted on an associated vehicle, and a second one of which is an elongated arm member rotatably carried by the first, and means provided on both said members to interchangeably carry an associated auxiliary device.

4. An attachment for vehicles, comprising:
A primary support column;
An umbrella;
A secondary support member carrying said umbrella, the member having a substantial extent both horizontally and vertically;
Means accommodating rotation of said umbrella, and for maintaining a selected position of rotational adjustment thereof;
At least one of said support column and member having telescoping portions to permit variation in location of said umbrella.

5. An attachment for vehicles, comprising:
A pair of support members for carrying auxiliary devices;
The end-portions of said primary and secondary support members being provided with similar means for supporting an auxiliary device to permit said auxiliary device to be supported interchangeably by either member at the choice of the user;
Each such member being adjustable in length, and one of said support members being rotatable about the other.

References Cited by the Examiner
UNITED STATES PATENTS

| | | | |
|---|---|---|---|
| 384,784 | 6/88 | Pihl | 248—287 X |
| 840,241 | 1/07 | Nootbaar | 248—40 X |
| 1,044,889 | 11/12 | Hyde | 211—182 X |
| 1,900,691 | 3/33 | Carlson | 248—287 X |
| 1,981,938 | 11/34 | Anderson | 287—54 |
| 2,184,583 | 12/39 | Danko | 248—40 |
| 2,605,778 | 8/52 | Clapper | 248—40 X |
| 2,632,850 | 3/53 | Anderson | 248—43 X |

CLAUDE A. LE ROY, *Primary Examiner.*